Patented July 6, 1943

2,323,590

UNITED STATES PATENT OFFICE 2,323,590

PHOTOGRAPHIC COLOR PICTURE

Alfred Fröhlich and Wilhelm Schneider, Dessau, and Paul Heisel, Gersthofen, Germany, assignors to General Aniline & Film Corporation, New York, N. Y., a corporation of Delaware No Drawing. Application October 24, 1940, Serial No. 362,592. In Germany November 9, 1939

11 Claims. (Cl. 95—6)

Our present invention relates to the manufacture of photographic color pictures.

It is known to produce photographic color pictures with the aid of color development by using dyestuff formers fast to diffusion which are added to the photographic silver halide emulsion in an aqueous solution and can no longer be washed therefrom. Such dyestuff formers are prepared from simple dyestuff components by introducing into them certain substituents capable of preventing diffusion or by connecting dyestuff components to compounds fast to diffusion. For instance, substantive groups, radicals of high polymeric carboxylic acids, carbon chains with more than five carbon atoms, sterol radicals, resin radicals, polypeptide radicals, and radicals of compounds of the cyclic menthane series have been proposed as substituents which prevent the diffusion of the components. Moreover, certain groups as sulfo or carboxyl groups such are introduced into these dyestuff formers in order to render them water or alkali soluble and thus to facilitate the incorporation thereof in the emulsion.

It is an object of our present invention to provide a process of producing photographic color pictures in which such substances serve as the dyestuff formers as are obtained by condensing aromatic hydroxy compounds capable of forming a dyestuff, with terpenes or terpene derivatives, for instance halogen derivatives to thereby produce hydroxyaryl-terpenes.

A further object of the invention is the provision of a silver halide emulsion for color photography which contains as the dyestuff former a terpene condensation product of the kind aforementioned.

Other objects of our invention will appear from the following description.

Such condensation products from terpenes and mono- or polyhydroxybenzenes or derivatives thereof may, for instance be prepared in the manner described in U. S. Patent No. 2,145,369 dated January 31, 1939. The condensation products are viscous or solid resinous substances which are easily soluble in methanol and more or less difficultly soluble in alkalies corresponding with the constitution of the used hydroxybenzene. In order to obtain products which are easily soluble in weak alkalies hydroxybenzoic acid may be condensed with terpenes or acid groups may be introduced into the condensate, for instance by dissolving the condensation product in concentrated sulfuric acid and again precipitating the product with water or an organic solvent such as benzene or benzine. These condensation products which are soluble in water or diluted alkalies have the advantage that they can be added to the emulsion in dissolved form. In the present case, however, the condensation products which are difficultly soluble in water or alkalies are also well adapted to serve as dyestuff formers in photographic silver halide emulsions because the resins have the favorable property of being precipitated by means of water, from a methanolic, if desired weakly alkaline solution in the form of a suspension which when dried together with gelatin forms a completely transparent layer clear as glass. In precipitating the suspension known suspension agents, for instance sulfonated castor oils or alkylnaphthalenesulfo acids may be employed.

The solutions or suspensions of these phenol-terpene resins can be added to a photographic silver halide emulsion at any stage in the manufacture thereof. Before casting the emulsion or before the addition of a sensitizer thereto, the emulsion can if desired be subjected to a washing procedure. Furthermore, the solutions or suspensions of the condensation products may be mixed with a gelatin solution or the condensation products may be directly dissolved in gelatin or suspended therein whereupon this gelatin, if necessary after a treatment in a water bath, is added to a silver halide emulsion or a photographic emulsion is produced with the gelatin. The silver halide emulsions thus obtained are worked up into photographic layers in known manner and there may be one or several layers on one or both sides of a support, said layers being superimposed on each other. For the purpose of color photography the emulsion layers are preferably sensitized for different ranges of the spectrum.

The emulsion layers may also be made in another manner. For example differently sensitized emulsions containing different dyestuff formers may be distributed in the form of small particles on a support.

The color picture may be produced in various ways for example in the manner described in any of the U. S. Patents 2,179,228, 2,179,238, 2,186,849, 2,179,234, 2,178,612, 2,186,730. In the exposed emulsion layers the pictures may be developed by simple color development or by reversal development as described for instance in the U. S. Patent 2,229,137, filed January 17, 1937, and in U. S. Patent 2,179,234. Moreover the new dyestuff formers may be used together with other known dyestuff formers in the several layers.

In the silver halide emulsion layers prepared according to our invention sound records may be produced besides the color pictures, for instance in the manner as described in any one of the U. S. Patents 2,220,178 and 2,178,882.

The following examples illustrate the invention:

Example I

To 1 kilo of a silver halide emulsion there are added 5 grams of hydroxyphenyl-camphene dissolved in 100 cc. of methanol and 10 cc. of n/1 solution of caustic soda. After casting and drying, the layers obtained are exposed and developed with p-aminodimethylaniline whereby a blue dyestuff image is produced. If the silver image is converted into a β-naphthalene-antidiazotate silver image and this image is treated in a weakly acid solution, a yellowish red azodye image is obtained.

Example II 5 grams of camphene-cresol are dissolved in 50 cc. of methanol. To this solution 10 cc. of n/1 solution of caustic soda are added. The solution thus obtained is heated and then mixed while stirring with 100 cc. of water warmed to 40° C. The resulting suspension is added to 1 kilo of silver halide emulsion. By treating the emulsion as described in Example I, a blue dyestuff image is produced.

Example III 5 grams of hydroxycresyl-camphene are dissolved in 50 cc. of methanol. The solution thus obtained is mixed with 100 cc. of 7% gelatin while stirring whereupon the gelatin is added to one kilo of silver halide emulsion. By working up the emulsion as described in Example I a blue dyestuff image is produced.

Example IV 5 grams of xylenol-camphene are dissolved in 50 cc. of methanol. To this solution 10 cc. of n/1 solution of caustic soda are added. The mass is then mixed with 1 kilo of silver halide emulsion. By treating the emulsion as mentioned in Example I a blue dyestuff image is produced.

Example V 5 grams of camphene-cresol are dissolved in 50 cc. of methanol. To this solution there are added 10 cc. of n/1 solution of caustic soda. The obtained mass is mixed with 1 kilo of silver halide emulsion. By treating the emulsion as mentioned in Example I a blue dyestuff image is formed.

Example VI 5 grams of a condensate prepared from o-chlorophenol and camphene are dissolved in 50 cc. of methanol. The solution is mixed with 10 cc. of n/1 solution of caustic soda and this mixture is then added to 1 kilo of silver halide emulsion. By working up the emulsion as described in Example 1 an olive green image is produced.

Example VII 5 grams of a condensate derived from pyrocatechol and pine oil are dissolved in 100 cc. of methanol. The solution is mixed with 10 cc. n/1 solution of caustic soda and this mixture is then added to 1 kilo of silver halide emulsion. By working up the emulsion as described in Example I a blue dyestuff image is obtained.

The above named condensate is for instance prepared as follows: A mixture of 5.5 kilos of pyrocatechol, 15.5 kilos of pine oil, and 1000 cc. of xylene is heated to reflux while stirring for 100 hours. The water which is set free during the reaction is driven off by azeotropic distillation. The solvent is then again separated by distillation in vacuo. After the distillate boiling up to 150° C. has been driven off under a pressure of 3 mm. of Hg, 12.2 kilos of a hard light brown resin of a molecular weight of 382 remain as the condensation product.

Example VIII 5 grams of a resorcinol resin prepared for instance as mentioned below are dissolved in 100 cc. of methanol. The solution is mixed with 10 cc. of n/1 solution of caustic soda and this mixture is then added to 1 kilo of silver halide emulsion. By working up the emulsion in the manner described in Example I a blue dyestuff image is produced.

A mixture of 30 kilos of dipentene and 11 kilos of resorcinol is heated with stirring under reflux. After heating for 50 hours the condensation is finished. 2.8 kilos of dipentene which have served as solvent are recovered by distillation in vacuo. 38.2 kilos of a distillable hard light yellow resin remain as the condensation product.

Example IX 5 grams of a condensation product from pyrogallol and camphene prepared for instance as described below are dissolved in 100 cc. of methanol. The solution is mixed with 100 cc. of n/1 solution of caustic soda and the whole is then added to 1 kilo of silver halide emulsion. By treating the emulsion as stated in Example I a blue dyestuffs image is produced.

A mixture of 12.6 kilos of pyrogallol, 40.8 kilos of camphene, and 1000 cc. of benzene is heated with continuous stirring and under reflux until the reaction is finished. After the solvent has been distilled off in vacuo, the distillate boiling up to 150° is separated from the reaction mass under a pressure of 3 mm. Hg. The remaining condensation product (32.6 kilos) is a brown viscous resin.

Example X 5 grams of a condensate from pine oil and phenol produced for instance as stated below are dissolved in 100 cc. of methanol. The solution is mixed with 10 cc. of n/1 solution of caustic soda and the whole is then added to 1 kilo of silver halide emulsion. By treating the emulsion as described in Example I a blue dyestuff image is obtained.

A mixture of 12 kilos of pine oil, 0.12 kilo of dipentene, and 5.5 kilos of phenol is condensed in the presence of a catalyst consisting of 3 parts of activated carbon and one part of phosphoric acid. The water set free during the reaction is driven off by azeotropic distillation. The principal distillate (13 kilos) contains 66.5 per cent of hydroxyphenylcamphane and 33.5 per cent of phenoxycamphane. The residue, amounting to 0.5 kilo, is a hard, light-brown, resinous mass.

Example XI 5 grams of a resin from northern sulfate oil and phenol produced for example as described below are dissolved in 100 cc. of methanol. The solution is mixed with 10 cc. of n/1 solution of caustic soda and the whole is then added to 1 kilo of silver halide emulsion. By working up the emulsion as described in Example I a blue dyestuff image is produced.

A mixture of 54.5 kilos of northern sulfate oil and 38 kilos of phenol is condensed while stirring in the presence of a catalyst consisting of 4 parts of activated carbon and 1 part of phosphoric acid. After the condensation is finished the mass (10 kilos) of terpene and phenol which has not been converted is driven off with steam. The subsequent distillation in vacuo of the raw product (82.5 kilos) yields 79 kilos of a substance 49 per cent of which consist of hydroxyphenylmenthene and 51 per cent are phenoxymenthene. A resinous mass of 3.5 kilos remains as the residue from distillation.

We claim:

1. In a process of producing photographic color pictures by dyestuff forming development, the improvement which comprises exposing a photographic silver halide emulsion containing as the dyestuff former hydroxyphenyl camphene and developing said emulsion with a developer containing p-aminodimethylaniline.

2. In a process of producing photographic color pictures by dyestuff forming development, the improvement which comprises exposing a photographic silver halide emulsion containing as the dyestuff former camphene cresol and developing said emulsion with a developer containing p-aminodimethylaniline.

3. In a process of producing photographic color pictures by dyestuff forming development, the improvement which comprises exposing a photographic silver halide emulsion containing as the dyestuff former hydroxycresyl camphene and developing said emulsion with a developer containing p-aminodimethylaniline.

4. A silver halide emulsion for color photography containing as the dyestuff former hydroxyphenyl camphene.

5. A silver halide emulsion for color photography containing as the dyestuff former camphene cresol.

6. A silver halide emulsion for color photography containing as the dyestuff former hydroxycresyl camphene.

7. The process of producing photographic color pictures which comprises developing an exposed silver halide emulsion with an aromatic developer containing a primary amino group and simultaneously reacting the oxidation products produced in such development with a color former comprising a hydroxyaryl-terpene.

8. The process as defined in claim 7, wherein said color former is located in said silver halide emulsion.

9. The process as defined in claim 7, wherein said color former contains a water-solubilizing group.

10. A silver halide emulsion for color photography containing as the color former a hydroxyaryl terpene.

11. A silver halide emulsion for color photography containing as the color former a hydroxyaryl terpene containing a water-solubilizing group.

ALFRED FRÖHLICH.
WILHELM SCHNEIDER.
PAUL HEISEL.

CERTIFICATE OF CORRECTION.

Patent No. 2,323,590.            July 6, 1943.

ALFRED FRÖHLICH, ET AL.

It is hereby certified that error appears in the printed specification of the above numbered patent requiring correction as follows: Page 1, first column, line 21, strike out the word "such" and insert the same after "groups" first occurrence, in line 20; page 2, second column, line 34, for "100 cc." read --10 cc.--; line 38, for "dyestuffs" read --dyestuff--; and that the said Letters Patent should be read with this correction therein that the same may conform to the record of the case in the Patent Office.

Signed and sealed this 21st day of December, A. D. 1943.

(Seal)                                Henry Van Arsdale,
                                       Acting Commissioner of Patents.